United States Patent
Milewski

(10) Patent No.: US 10,943,747 B2
(45) Date of Patent: Mar. 9, 2021

(54) MOTOR DRIVE OF ELECTRICAL APPARATUSES

(71) Applicant: ABB Schweiz AG, Baden (CH)

(72) Inventor: Krzysztof Milewski, Karniewo (PL)

(73) Assignee: ABB Schweiz AG, Baden (CH)

( * ) Notice: Subject to any disclaimer, the term of this patent is extended or adjusted under 35 U.S.C. 154(b) by 39 days.

(21) Appl. No.: 16/140,929

(22) Filed: Sep. 25, 2018

(65) Prior Publication Data

US 2019/0027323 A1 Jan. 24, 2019

Related U.S. Application Data

(63) Continuation of application No. PCT/EP2017/000195, filed on Feb. 10, 2017.

(30) Foreign Application Priority Data

Mar. 25, 2016 (EP) .................... 16460015

(51) Int. Cl.
*F16H 37/04* (2006.01)
*H01H 3/26* (2006.01)
(Continued)

(52) U.S. Cl.
CPC ............. *H01H 3/26* (2013.01); *F16H 37/041* (2013.01); *F16H 57/039* (2013.01); *H01H 3/32* (2013.01);
(Continued)

(58) Field of Classification Search
CPC .............................. F16H 37/041; F16H 57/039
See application file for complete search history.

(56) References Cited

U.S. PATENT DOCUMENTS 2,723,318 A 11/1955 Jansen
4,717,799 A * 1/1988 Spinner .................... H01H 3/40
200/568

(Continued)

FOREIGN PATENT DOCUMENTS

DE 3710149 C1 8/1988
GB 609394 A 9/1948

OTHER PUBLICATIONS

European Patent Office, International Search Report & Written Opinion issued in corresponding Application No. PCT/EP2017/000195, dated Mar. 24, 2017, 8 pp.
(Continued)

*Primary Examiner* — Derek D Knight
(74) *Attorney, Agent, or Firm* — Taft Stettinius & Hollister LLP

(57) ABSTRACT

This application discloses a motor drive of electrical apparatuses which drives medium and high voltage switch disconnectors, circuit breakers, disconnectors, and earthing switches. The disclosed drive includes a system of reduction transmissions including a worm transmission and a cycloidal transmission located in a common housing. The axis of the output shaft of the drive is situated centrically on the axis of a wormwheel of the worm transmission, in the axis of the output gear of the cycloidal transmission and in the axis of a revolving eccentric bush. The wormwheel of the worm transmission is mounted immovably on the revolving eccentric bush on which there is mounted rotatably a gear wheel of the cycloidal transmission whose output gear is coupled with a slidable bush of a disengaging coupling mounted on the free end of the output shaft of the drive.

20 Claims, 4 Drawing Sheets

Figure 1:
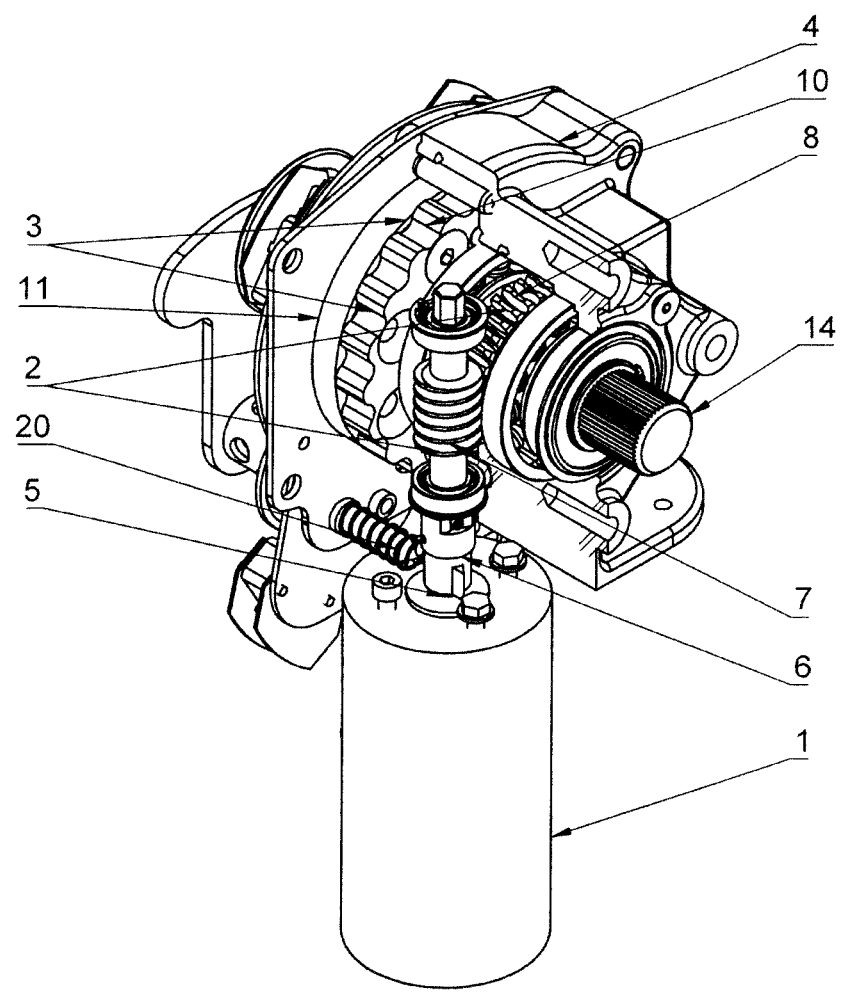

(51) Int. Cl.
*H01H 19/56* (2006.01)
*H01H 3/32* (2006.01)
*H01H 9/00* (2006.01)
*H02K 11/20* (2016.01)
*F16H 57/039* (2012.01)
*H01H 3/42* (2006.01)
*H01H 9/24* (2006.01)
*H02K 7/116* (2006.01)
*F16H 57/02* (2012.01)

(52) U.S. Cl.
CPC ............ *H01H 3/42* (2013.01); *H01H 9/0027* (2013.01); *H01H 9/24* (2013.01); *H01H 19/56* (2013.01); *H02K 7/1166* (2013.01); *H02K 11/20* (2016.01); *F16H 2057/02034* (2013.01); *H01H 2003/266* (2013.01); *H01H 2003/323* (2013.01)

(56) References Cited

U.S. PATENT DOCUMENTS 4,880,949 A * 11/1989 Spinner .................... H01H 3/40
  200/501
10,473,201 B2 * 11/2019 Favilla .................. F16H 37/065

OTHER PUBLICATIONS

European Patent Office, Extended Search Report issued in corresponding Application No. 16460015.7, dated Aug. 26, 2016, 5 pp.

* cited by examiner

MOTOR DRIVE OF ELECTRICAL APPARATUSES

This invention discloses a motor drive of electrical apparatuses which drives medium and high voltage switch disconnectors, circuit breakers, disconnectors, and earthing switches.

Well-known motor drives used for driving electric power equipment such as switch disconnectors, circuit breakers, disconnectors, and earthing switches comprise an electric motor which drives the input shaft of the electric power equipment through a system of multi-stage gear transmissions.

There is known a motor drive manufactured by ABB denoted as UMC 40. The drive is intended for functioning together with medium voltage disconnectors, switch disconnectors and earthing switches in indoor conditions. The drive comprises an electric motor with an output shaft connected with the first wheel of a gear transmission which meshes with the second gear wheel with an increased number of teeth, causing the first degree of speed reduction. The second gear wheel is mounted on a shaft with a trapezoidal thread on which a nut with a female thread is mounted allowing to achieve the second degree of speed reduction. The nut causes that the rotary motion of the shaft with the trapezoidal thread is transmitted to the rotary motion of the output shaft of the drive through a lever connecting the nut with the output shaft of the drive, which causes the third degree of speed reduction. The electric motor turns the first gear wheel and thus sets the shaft with the trapezoidal thread in rotary motion causing the nut to move along the axis of the threaded shaft; thereby setting in rotary motion the output shaft that has its speed reduced compared the speed of the motor. In the described solution, the angle of rotation of the output shaft of the drive is constant, which means that the motor drive is intended only for one type of electric equipment driven by that drive. The described drive is provided with an electric interlocking which enables the motor power disconnection and a mechanical interlocking which allows to block the rotation of the motor shaft. The electric interlocking comprises one limit switch. The mechanical interlocking is executed by means of a bush which blocks a lever which connects the nut with the output shaft of the drive.

Known motor drives have relatively large dimensions, which limits their use indoors. The use of multistage gear transmissions requires the application of at least three stages of the output shaft speed reduction, which also entails large dimensions and large weight of the drives. In known solutions, the use of three stages of speed reduction results in reduced mechanical efficiency of the drive. Another inconvenience of the known solutions is that it is possible to use the manual manoeuvring lever during motor operation, which poses a threat to the user operating the disconnector, switch disconnector or earthing switch. That is why there is a need to find an alternative to the known solutions, which would be free from the mentioned inconveniences.

The essential attribute of the motor drive of electrical apparatuses which comprises an electric motor connected with the output shaft of the drive through a system of transmissions reducing the speed of the motor shaft, and provided with a mechanical interlocking and an electric interlocking, is that the system of reduction transmissions comprises a worm transmission and a cycloidal transmission placed in a common housing, and the axis of the output shaft of the drive is situated centrically in the axes of: the wormwheel of the worm transmission, the output gear of the cycloidal transmission, and the axis of a revolving eccentric bush. The wormwheel of the worm transmission is mounted immovably on the revolving eccentric bush on which the gear wheel of the cycloidal transmission is rotatably mounted. The output gear of the cycloidal transmission is coupled with the slidable bush of a disengaging coupling mounted on the free end of the output shaft of the drive.

Preferably, limit switches which are situated at an acute or obtuse angle to one another are attached to the front surface of the common housing of the worm transmission and the cycloidal transmission, on the side where the free end of the output shaft of the drive is situated.

Preferably, each of the limit switches is suitable for de-energizing the electric motor through a switching-off contact element in the form of a pusher located on the external circumferential surface of the output gear of the cycloidal transmission.

Preferably, to the common housing of the worm transmission and the cycloidal transmission there is connected a drive mode selector comprising an external holder which, through the selector contact bush, is connected with a blocking pin suitable for blocking the rotation of the motor shaft depending on the selected drive mode.

Preferably, the selector is provided with a limit switch suitable for de-energizing the electric motor and situated near the contacts of the contact bush and attached to the front surface of the common housing of the worm transmission and the cycloidal transmission.

The main characteristic of the combined medium or high voltage switch disconnector is that it comprises the motor drive of claims 1-5.

The main characteristic of the combined medium or high voltage circuit breaker is that it comprises the motor drive of claims 1-5.

The main characteristic of the combined medium or high voltage disconnector is that it comprises the motor drive of claims 1-5.

The main characteristic of the combined medium or high voltage earthing switch is that it comprises the motor drive of claims 1-5.

The advantage of the present invention is a considerable decrease in the mass and dimensions of the drive, with a concurrent improved functionality of the drive, owing to an arrangement causing a change in the angle of rotation of the output shaft of the drive. By combining a worm transmission with a cycloidal one a better efficiency of the drive is achieved compared to known solutions concerning motor drives that drive devices such as medium and high voltage switch disconnectors, circuit breakers, disconnectors, and earthing switches. The use of electric and mechanical interlocking of the construction presented in this invention improves operation safety. The use of the system of switches makes it possible to change the angle of rotation of the output shaft and thereby it enhances the functionality of the drive. The fact that the output shaft of the drive is situated on one axis with the cycloidal transmission reduces the dimensions of the drive considerably and enables the use of a disengaging coupling to disconnect the output shaft from the transmission and thus allows manual operation of the drive.

The benefit and advantage of the combined electrical apparatuses is that the motor drive can be located at a safe distance from the driven equipment, which allows manual operation in emergency situations.

Figure 2:
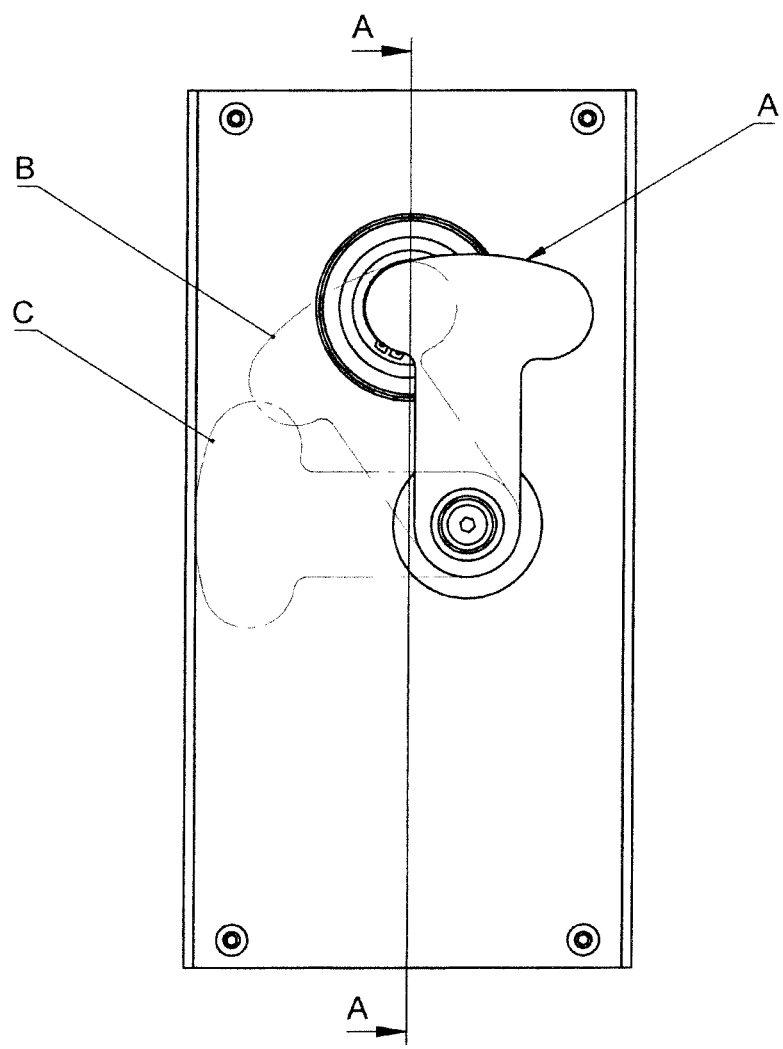
Figure 3:
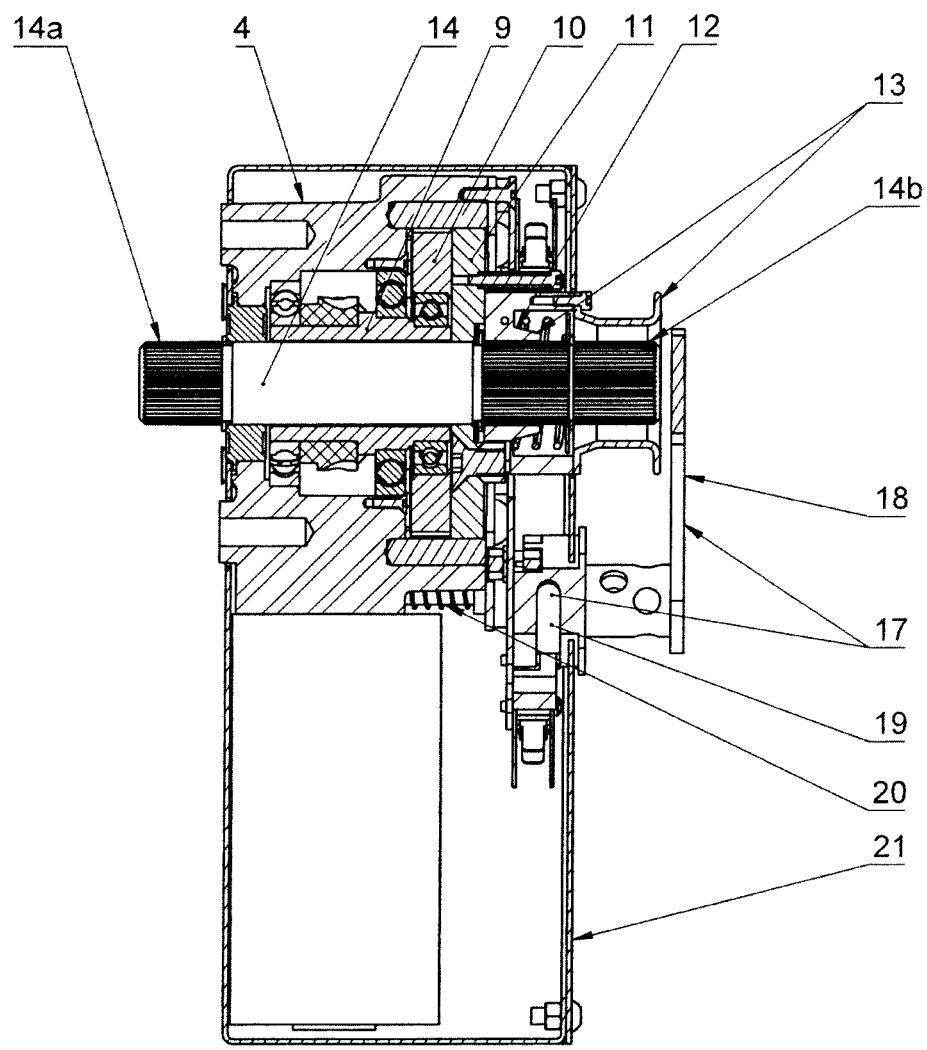
Figure 4:
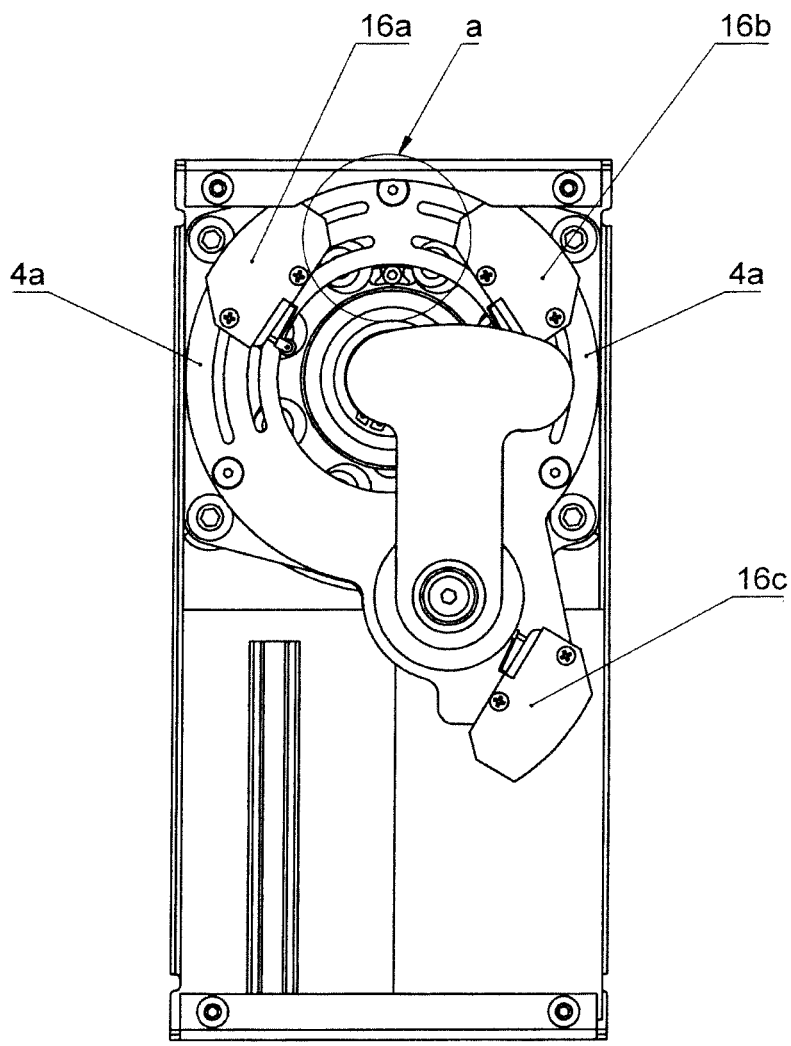
Figure 5:
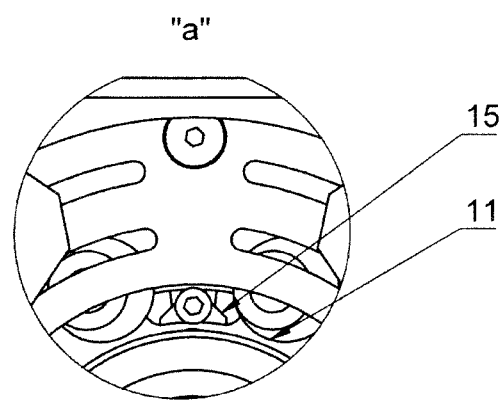

An embodiment of the invention is shown in the drawing, where:

FIG. 1 shows the motor drive without the external housing in perspective view, with a partial broken-out section, FIG. 2—a front view of the drive placed in an external housing, FIG. 3—the motor drive of FIG. 2 in section A-A, FIG. 4—a front view of the drive of FIG. 2, after removal of the front wall of the external housing, FIG. 5—detail "a" of FIG. 4.

The motor drive comprises an electric motor 1, a worm transmission 2 and a cycloidal transmission 3, where the transmissions 2 and 3 are placed in a common housing 4 possessing a front disc 4a situated on a plane parallel to the axis of the cycloidal transmission 3. A rotating shaft 5 of the electric motor 1 is connected with a worm 7 of the worm transmission 2 through a permanent coupling 6, which worm 7 meshes with a wormwheel 8 mounted immovably on an eccentric bush 9 mounted rotatably in the housing 4. A gear wheel 10 of the cycloidal transmission 3 is mounted rotatably on the bush 9. The gear wheel 10 is situated eccentrically relative to the axis of rotation of the eccentric bush 9. The gear wheel 10 of the cycloidal transmission 3 is connected separably with an output gear 11 of the cycloidal transmission 3 by outlets mounted in the gear wheel 10 and matching holes made in the output gear 11, which is not shown in the drawing. The output gear 11 is situated axially relative to the eccentric bush 9 and it is coupled with a slidable bush 12 which is a component of a disengaging coupling 13 mounted on the free end 14b of the output shaft 14. The slidable bush 12 is slidably connected with an output shaft 14 situated axially inside the eccentric bush 9. The connecting accessories of electric power equipment, which are not shown in the drawing, are connected to the working end 14a of the output shaft 14. On the circumferential surface of the output gear 11 of the cycloidal transmission 3 there is located a pusher 15 which is a stop limiting the rotation of the output gear 11, functioning together with typical limit switches 16a and 16b attached to the disc 4a of the housing 4 of the transmission. The limit switches 16a and 16b are arranged on the front surface of the disc 4a, at an acute or obtuse angle to one another. The limit switches are connected with the electric system of the drive, which is not shown in the drawing. The drive is provided with a mechanical device for selecting one of three modes, which is a selector 17 connected externally to the housing of the transmission 4. The mode of operation of the drive is defined by the position of the selector 17. The selector comprises an external holder 18 permanently connected to a revolving contact bush 19 comprising contacts, which are not shown in the drawing, in whose axis there is slidably located a blocking pin 20 which blocks the rotation of the shaft 5 of the motor 1 if the relevant mode of the drive operation is selected. The contact bush 19 is permanently connected with the front disc 4a of the housing. The selector 17 is also provided with a limit switch 16c, which is mounted to the disc 4a of the transmission housing 4, near the contact bush 19 whose contacts together with the contacts of the switch 16c enable the disconnection of the electric system of the drive if the relevant mode of the drive operation is selected. The contact bush 19 is separably connected with the blocking pin 20 whose function is to block the shaft 5 of the motor 1. The motor 1 and the housing of the transmission 4 together with the disc 4a are enclosed in the external housing 21.

The functioning of the drive of the invention is explained as follows.

An electric motor 1 through a shaft 5 and a permanent coupling 6 transmits motion to a worm 7 of a worm transmission 2, which worm transmits motion to a wormwheel 8 of the worm transmission 2 through meshing, thus achieving the first stage of speed reduction. The wormwheel 8 drives a cycloidal transmission 3 through an eccentric bush 9. The cycloidal transmission 3 provides the second and last stage of speed reduction. Motion is transmitted from an output gear 11 of the cycloidal transmission 3 through a disengaging coupling 13 to the output shaft 14 of the drive, which results in the transmission of an increased torque from the cycloidal transmission 3 through the disengaging coupling 13 to an output shaft 14, thereby reducing the motor speed considerably. The angle of rotation of the output shaft 14 is defined by the situation of limit switches 16a and 16b, which enables the use of the drive in various types and kinds of driven electric power equipment. After contacting one of the limit switches 16a or 16b, the pusher 15 of the output gear 11 causes disconnection of the motor 1 power by a known method. The selector 17 makes it possible to set one of three types of mode of operation of the drive. In position A, an external holder 18 blocks the possibility of disengaging the disengaging coupling 13, thereby preventing manual rotation of the output shaft 14, which means motor operation. In position B, a contact bush. 19 blocks the possibility of rotation of the motor 1 shaft by shifting a blocking pin 20. The external holder 18 blocks the possibility of disengaging the disengaging coupling 13, thereby preventing manual rotation of the output shaft 14. The contact bush 19, on contacting a limit switch 16c, disconnects the electric circuit of the motor 1 by a known method, preventing it from being energized. In position C, the contact bush 19 blocks the possibility of rotation of the motor 1 shaft by shifting the blocking pin. The contact bush 19, on contacting the limit switch 16c, disconnects the electric circuit of the motor 1, preventing it from being energized. In position C, after retracting the disengaging coupling 13, it is possible to manually rotate the output shaft 14 by connecting a manoeuvring lever to the shaft, which is not shown in the drawing.

If a combined switch disconnector or circuit breaker is used, the output shaft of the drive 14 of the invention is directly or indirectly coupled with the input shaft of the disconnector/circuit breaker which is not shown in the drawing. The indirect coupling is executed by known intermediate elements such as tubular connectors, other shafts and intersecting axis gears.

If a combined disconnector or earthling switch is used, the output shaft of the drive 14 of the invention is directly or indirectly coupled with the main shaft of the disconnector/earthling switch, which is not shown in the drawing. The indirect coupling is executed by known intermediate elements such as tubular connectors, other shafts and intersecting axis gears.

LEGEND

1—the electric motor
2—the worm transmission
3—the cycloidal transmission
4—the housing of the worm transmission and cycloidal transmission
4a—the front disc of the housing 4
5—the motor shaft
6—the permanent coupling
7—the worm of the worm transmission
8—the wormwheel of the worm transmission
9—the revolving eccentric bush
10—the gear wheel of the cycloidal transmission
11—the output gear of the cycloidal transmission 12—the slidable bush
13—the disengaging coupling
14—the output shaft of the drive
14a—the working end of the output shaft
14b—the free end of the output shaft
15—the pusher
16a, 16b, 16c—the limit switches
17—the selector
18—the external holder of the selector
19—the revolving contact bush of the selector
20—the blocking pin of the selector
21—the external housing

The invention claimed is:

1. A system comprising:
a motor drive of electrical apparatuses comprising an electric motor connected with an output shaft of the motor drive through a system of transmissions reducing a speed of a motor shaft, and a mechanical interlocking and an electric interlocking, wherein the system of transmissions comprises a worm transmission and a cycloidal transmission both placed in a common housing, an axis of the output shaft of the motor drive being situated centrically in an axis of a wormwheel of the worm transmission, in an axis of an output gear of the cycloidal transmission and in an axis of a revolving eccentric bush, and the wormwheel of the worm transmission is mounted immovably on the revolving eccentric bush on which there is rotatably mounted a gear wheel of the cycloidal transmission having an output gear coupled with a slidable bush of a disengaging coupling mounted on a free end of the output shaft of the motor drive.

2. The drive system as recited in claim 1, which further comprises a plurality of limit switches, which are situated at an acute or obtuse angle to one another, are attached to a front surface of the common housing of the worm transmission and the cycloidal transmission on a side where the free end of the output shaft of the motor drive is situated.

3. The system as recited in claim 2, wherein each of the plurality of limit switches is suitable for de-energizing the electric motor through a switching-off contact element in the form of a pusher located on an external circumferential surface of the output gear of the cycloidal transmission.

4. The system as recited in claim 1, wherein a selector of a drive mode comprising an external holder which is connected with a blocking pin through a contact bush of the selector, which pin is suitable for blocking a rotation of the motor shaft depending on the selected drive mode, is connected to the drive housing.

5. The system as recited in claim 4, wherein the selector has a limit switch suitable for de-energizing the electric motor and situated near a contacts of the contact bush and fixed to a front surface of the drive housing.

6. The system as recited in claim 1, which further comprises a combined medium or high voltage switch disconnector.

7. The system as recited in claim 6, which further comprises a plurality of limit switches, which are situated at an acute or obtuse angle to one another, are attached to a front surface of the common housing of the worm transmission and the cycloidal transmission on a side where the free end of the output shaft of the motor drive is situated.

8. The system as recited in claim 7, wherein each of the plurality of limit switches is suitable for de-energizing the electric motor through a switching-off contact element in the form of a pusher located on an external circumferential surface of the output gear of the cycloidal transmission.

9. The system as recited in claim 6, wherein a selector of the drive mode comprising an external holder which is connected with a blocking pin through a contact bush of the selector, which pin is suitable for blocking a rotation of the motor shaft depending on the selected drive mode, is connected to the drive housing.

10. The system as recited in claim 1, which further comprises a combined medium or high voltage circuit breaker.

11. The system as recited in claim 10, which further comprises a plurality of limit switches, which are situated at an acute or obtuse angle to one another, are attached to a front surface of the common housing of the worm transmission and the cycloidal transmission on a side where the free end of the output shaft of the motor drive is situated.

12. The system as recited in claim 11, wherein each of the plurality of limit switches is suitable for de-energizing the electric motor through a switching-off contact element in the form of a pusher located on an external circumferential surface of the output gear of the cycloidal transmission.

13. The system as recited in claim 10, wherein a selector of the drive mode comprising an external holder which is connected with a blocking pin through a contact bush of the selector, which pin is suitable for blocking a rotation of the motor shaft depending on the selected drive mode, is connected to the drive housing.

14. The system as recited in claim 1, which further comprises a combined medium or high voltage disconnector.

15. The system as recited in claim 11, which further comprises a plurality of limit switches, which are situated at an acute or obtuse angle to one another, are attached to a front surface of the common housing of the worm transmission and the cycloidal transmission on a side where the free end of the output shaft of the motor drive is situated.

16. The system as recited in claim 15, wherein each of the plurality of limit switches is suitable for de-energizing the electric motor through a switching-off contact element in the form of a pusher located on an external circumferential surface of the output gear of the cycloidal transmission.

17. The system as recited in claim 11, wherein a selector of the drive mode comprising an external holder which is connected with a blocking pin through a contact bush of the selector, which pin is suitable for blocking a rotation of the motor shaft depending on the selected drive mode, is connected to the drive housing.

18. The system as recited in claim 1, which further comprises a combined medium or high voltage earthing switch.

19. The system as recited in claim 18, which further comprises a plurality of limit switches, which are situated at an acute or obtuse angle to one another, are attached to a surface of the common housing of the worm transmission and the cycloidal transmission on a side where the free end of the output shaft of the motor drive is situated.

20. The system as recited in claim 19, wherein each of the plurality of limit switches is suitable for de-energizing the electric motor through a switching-off contact element in the form of a pusher located on an external circumferential surface of the output gear of the cycloidal transmission.

* * * * *